United States Patent [19]
Nakamura et al.

[11] Patent Number: 4,873,678
[45] Date of Patent: Oct. 10, 1989

[54] OPTICAL HEAD AND OPTICAL INFORMATION PROCESSOR USING THE SAME

[75] Inventors: Shigeru Nakamura, Tachikawa; Sadatsugi Machida, Hachioji; Tsuyoshi Toda, Kodaira, all of Japan

[73] Assignee: Hitachi, Ltd., Tokyo, Japan

[21] Appl. No.: 130,637

[22] Filed: Dec. 9, 1987

[30] Foreign Application Priority Data

Dec. 10, 1986 [JP] Japan .............................. 61-292307
Mar. 18, 1987 [JP] Japan .............................. 62-61022

[51] Int. Cl.$^4$ ..................... G11B 11/12; G11B 7/09; G11B 7/12
[52] U.S. Cl. ..................... 369/13; 369/112; 369/110; 369/118; 369/44; 369/45
[58] Field of Search .................. 369/110, 112, 118, 13, 369/44-46, 120, 124; 360/114, 59; 365/122; 350/397, 398, 3.7, 3.72; 250/201 DF

[56] References Cited
U.S. PATENT DOCUMENTS 4,682,315  7/1987  Uejima ................. 369/110
4,683,559  7/1987  Emoto et al. ........... 369/44
4,684,797  8/1987  Ando et al. ............ 369/45

FOREIGN PATENT DOCUMENTS 54-130102 10/1979  Japan .
60-35353   2/1985  Japan ................ 369/110
60-59545   4/1985  Japan .

Primary Examiner—Alan Faber
Assistant Examiner—Hoa T. Nguyen
Attorney, Agent, or Firm—Antonelli, Terry & Wands

[57] ABSTRACT

An optical head and an optical information processor using the optical head include a light source, focusing device for focusing a light beam which is emitted from the light source, on an information medium, beam separator for isolating at least part of a light beam which is reflected from the information medium, from the light beam emitted from the light source, a beam splitter including a first polarized-light separating film which is illuminated with about a half of a light beam isolated by the beam separator, and a light detecting device having a first photodetector which receives a first light beam reflected from the first polarized-light separating film, and a second photodetector which receives a second light beam passing through the first polarized-light separating film, in a state that at least one of the first and second photodetectors is separated into a pair of light detecting elements, to make it possible to detect a magneto-optical signal and a focal error signal by the same optical system.

20 Claims, 6 Drawing Sheets

OPTICAL HEAD AND OPTICAL INFORMATION PROCESSOR USING THE SAME

CROSS-REFERENCES TO THE RELATED APPLICATIONS

The following co-pending U.S. patent applications are relating to the invention of this application:
U.S. patent application Ser. Nos. 743,974, filed on June 12, 1985 now U.S. Pat. No. 4,712,203; No. 828,354 filed on Feb. 11, 1986 now U.S. Pat. No. 4,742,218, No. 932,578 filed on Nov. 20, 1986 now U.S. Pat. No. 4,803,674, and No. 53,564 which is a Continuation application of U.S. patent application Ser. No. 658,123.

BACKGROUND OF THE INVENTION

The present invention relates to an optical head and an optical information processor using the same, and more particularly to an improved optical head suitable for use in an optical disk apparatus and an optical card reader.

An optical head used in an optical disk apparatus and an optical card reader is required to have a focal error detecting system, since the movement of an information medium in a direction perpendicular to the information recording surface is caused by the rotation or transfer of the information medium. There have been proposed various focal error detecting methods, one of which is the Foucault method. In this method, a light beam emitted from a light source is focused on an information medium by a focusing lens so as to form a fine light spot on the information medium, and the light beam reflected back from the information medium is separated from the light beam which is emitted from the light source, by a beam splitter. The reflected light beam thus obtained is separated by a mirror or the like into two parts, one of which is received by a photodetector separated into a pair of detecting elements. The photodetector is disposed at a position, on which the above light part is focused, and the difference between the outputs of the detecting elements is used as a focal error signal. In the Foucault method, however, a light spot formed on the photodetector has a very small diameter (that is, a diameter of tens of microns) when the light beam incident on the information medium is accurately focused thereon, and thus there arises a problem that a detection error is caused by the slight deviation of an optical element or the like from a predetermined position.

In order to solve the problem, there has been proposed another focal error detecting method. In this method, as described in a Japanese patent application JP-A- No. 54-130,102, the reflected light beam having been separated from the light beam which is emitted from the light source, is separated by a wedge prism into two beams, and two photodetectors each separated into a pair of detecting elements are disposed on a plane, on which the two beams are focused. According to this method, the detection error due to the positional deviation of an optical element can be prevented by adding two focal error signals which are obtained from the photodetectors.

Further, there has been known a different focal error detecting method. In this method, as described in a Japanese patent application JP-A- No. 60-59,545, the light beam reflected from an information medium is separated from the light beam which is emitted from the light source, by a beam splitter, and is then divided into two light beams each having a semicircular cross section. Further, a photodetector separated into two detecting elements is disposed in front of a position, on which one of two light beams is focused, and another photodetector separated into two detecting elements is disposed behind a position, on which the other light beam is focused. A change in size of the semicircular light spot formed on the photodetector due to the movement of an information medium in a direction perpendicular to the information recording surface thereof is used for generating a focal error signal. In more detail, the focal error signal is obtained from the difference between the outputs of two photodetectors each including two detecting elements. When only the output of one photodetector is used as a focal error signal, a change in the focal error signal due to the positional deviation of the information medium in a first direction perpendicular to the information recording surface thereof is not equal to a change in the focal error signal due to the same positional deviation of the information medium in a second direction opposite to the first direction. When the difference between the outputs of two photodetectors is used as a focal error signal, the signal level of the focal error signal is raised or lowered by the same amount, in accordance with whether the information medium is displaced by a desired distance in the first or second direction.

In each of the above methods, when the reflected light beam from the information medium is received by a two-division photodetector which is divided into two photodetector elements along its center line parallel to the longitudinal direction of the recording track on the information medium, a tracking error signal can be obtained from the difference between the outputs of the respective photodetector elements. Further, an information signal indicative of a change in light quantity of the reflected light beam is obtained from the sum of the outputs of two photodetector elements, and an information pit of the perforation type, phase type or phase-changing type can be reproduced from the above information signal.

In a conventional optical head, in which the reflected light beam from an information medium is separated into two parts by a mirror or wedge prism, it has not been taken into consideration to detect the rotation of the plane of polarization of a light beam at a time the light beam is reflected from a magneto-optical disk, thereby reproducing information from the disk. Accordingly, the optical head is required to include optical elements and a photodetector for obtaining a magneto-optical signal, in addition to the optical elements and photodetectors for obtaining the focal error signal and the tracking error signal. Thus, the number of optical elements included in the optical head is increased, and there arises a problem that the optical head becomes expensive and is large in size and weight.

SUMMARY OF THE INVENTION

An object of the present invention is to provide an optical head and an optical information processor which can perform, by using a common optical system in the optical head, not only reproduction of information recorded magneto-optically or in the form of pit type, phase type or phasechange type, but also detection of focal error and/or tracking error, resulting in small in the number of optical elements as used, low manufacturing cost and small in size and weight.

In order to attain the above object, according to an aspect of the present invention, the reflected light beam from an information medium is divided by a polarized-light separating film into two polarized light components to obtain a focal error signal, and the focal error signal and a magneto-optical signal can be obtained from the polarized light components by means of the same optical system. Further, not only the focal error signal and the magneto-optical signal but also a tracking error signal and an information signal for detecting an information pit of the perforation type, phase type or phasechange type can be obtained from the polarized light components by the same optical system. Thus, an optical head according to the present invention is suitable for use in a magneto-optical recording apparatus, in which a header signal such as an address signal is recorded in the form of a pit of the perforation type or phase type, and user data is recorded in the form of magnetic domains.

Further, according to another aspect of the present invention, one of polarized light components which are separated from each other by the polarized-light separating film, is reflected from a reflecting surface parallel to the separating film so that the reflected light component is parallel to the other polarized light component. Thus, these light components are received by a plurality of detecting elements of a photodetector which are arranged on the same plane, and a magneto-optical signal, a focal error signal, a tracking error signal and a signal indicative of the light quantity reflected from an information medium, are obtained from the outputs of the detecting elements.

DESCRIPTION OF THE PREFERRED EMBODIMENTS

Figure 1:
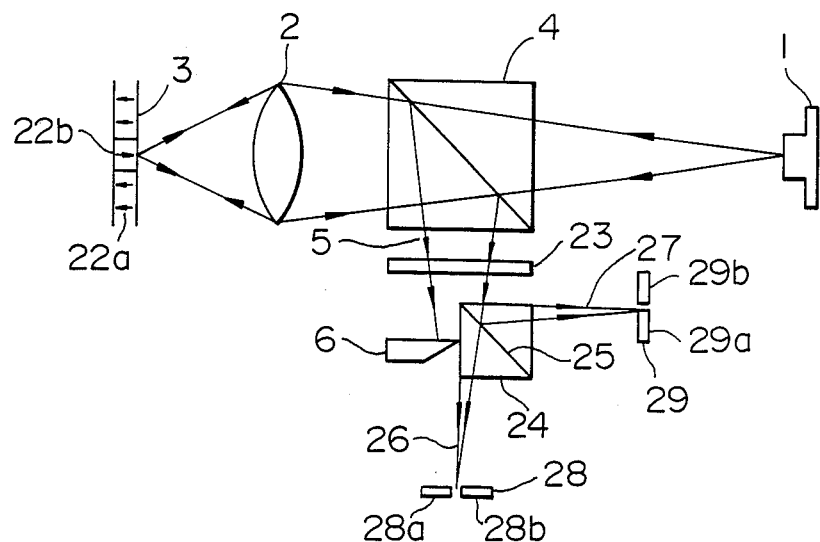
FIG. 1 is a schematic diagram showing the basic construction of an embodiment of an optical head according to the present invention.

FIG. 1 shows an embodiment of an optical head according to the present invention. First, explanation will be made of the detection principles of a focal error signal and a magneto-optical signal which principles are used in the present embodiment, with reference to FIGS. 1, 2A to 2C, 3A and 3B.

Figure 2A:
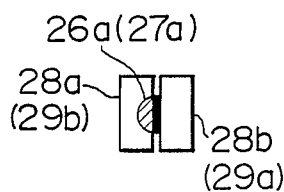
FIGS. 2A to 2C are schematic diagrams for explaining the detection principle of a focal error signal used in the embodiment of FIG. 1.
Figure 2B:
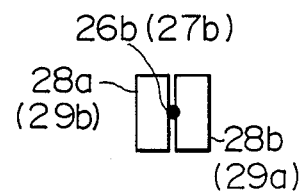
Figure 2C:
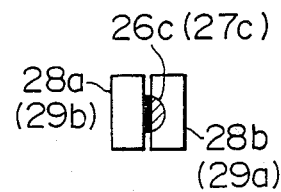
Figure 3A:
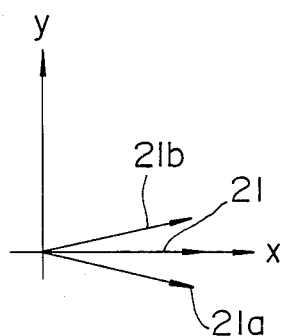
FIGS. 3A and 3B are schematic diagrams for explaining the detection principle of a magneto-optical signal.
Figure 3B:
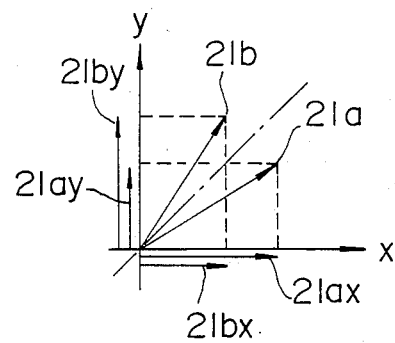

Referring to FIG. 1, a light beam emitted from a light source (for example, a semiconductor laser) 1 passes through a beam splitter 4, and is then focused on a magneto-optical disk 3 which is used as an information medium, by a focusing lens 2 so as to form a fine light spot on the disk 3. The light beam reflected back from the disk 3 is separated from the light beam which is emitted from the semiconductor laser 1, by the beam splitter 4. Now, let us define a direction on the paper containing FIG. 1 as an x-direction, and define a direction perpendicular to the paper as a y-direction. Further, let us suppose that the vibrational direction of polarized light emitted from the semiconductor laser 1 is parallel to the x-direction, as indicated by an arrow 21 in FIG. 3A. That portion of the magneto-optical disk 3 where information is not recorded, is magnetized in a direction indicated by an arrow 22a. When the light beam is reflected from this portion, the plane of polarization of the reflected light beam is rotated so that the reflected light vibrates in a direction which is indicated by an arrow 21a in FIG. 3A. While, that portion of the magneto-optical disk 3 where information has been recorded, is magnetized in a direction indicated by an arrow 22b. When the light beam is reflected from this portion, the plane of polarization of the reflected light beam is rotated so that the reflected light vibrates in a direction which is indicated by an arrow 21b in FIG. 3A. The reflected light beam 5 having been separated from the light beam which is emitted from the semiconductor laser 1, passes through a halfwave plate 23 which has an azimuth of 22.5° for the x-direction. Thus, the vibrational direction of light having passed through the halfwave plate 23 is rotated by an angle of 45°, as shown in FIG. 3B. A polarized-beam splitter 24 is inserted into the light beam 5 so that a half of the light beam 5 is incident on the beam splitter 24. The remaining half of the light beam 5 is blocked by a knife edge 6. A polarized-light separating film 25 included in the beam splitter 24 transmits an x-polarized component, and reflects a y-polarized component. When the light spot formed on the disk 3 moves from that portion of the disk 3 where information is not recorded, to that portion of the disk 3 where information has been recorded, the quantity of light passing through the beam splitter 24 is reduced by an amount corresponding to the difference in length between arrows $21a_x$ and $21b_x$ shown in FIG. 3B, and the quantity of light reflected from the beam splitter 24 is increased by an amount corresponding to the difference in length between arrows $21a_y$ and $21b_y$. When a light beam 26 having passed through the beam splitter 24 is received by a photodetector 28 and a light beam 27 reflected from the beam splitter 24 is received by another photodetector 29, a magneto-optical signal can be obtained from the difference between the outputs of the photodetectors 28 and 29. The plane of polarization of the light beam reflected from the magneto-optical disk 3 is rotated by a magnetic domain in the disk 3, only by an angle of +3° or −3°. Accordingly, light incident on the polarized-beam splitter 24 vibrates in a direction which makes an angle of about 45° with the x-direction. Thus, the transmitted light beam 26 formed of the x-polarized component is substantially equal in light quantity to the reflected light beam 27 formed of the y-polarized component. The photodetector 28 is separated into two detecting elements 28a and 28b, and is disposed at a position where the light beam 26 is focused. Further, the photodetector 29 is separated into detecting elements 29a and 29b, and is disposed at a position where the light beam 27 is focused. In a case where the light beam from the semiconductor laser 1 is focused on the disk 3, the light beam 26 (or 27) incident on the photodetector 28 (or 29), as shown in FIG. 2B, forms a fine light spot 26b (or 27b) on the photodetector, and the light quantity received by the detecting element 28a (or 29b) is equal to that received by the detecting element 28b (or 29b). In a case where the disk 3 is displaced so as to get near the focusing lens 2, the light beam 26 (or 27) incident on the photodetector 28 (or 29), as shown in FIG. 2C, forms a semicircular light spot 26c (or 27c) on the detecting element 28b (or 29a). In a case where the disk 3 is displaced so as to go away from the focusing lens 2, the light beam 26 (or 27), as shown in FIG. 2A, forms a semicircular light spot 26a (or 27a) on the detecting element 28a (or 29b). When the output signals of the detecting elements 28a, 28b, 29a and 29b are expressed by $S_{28a}$, $S_{28b}$, $S_{29a}$ and $S_{29b}$, respectively, the focal error signal is given by $(S_{28a}-S_{28b})$, $(S_{29b}-S_{29a})$ or $(S_{28a}-S_{28b}-S_{29a}+S_{29b})$, and the magneto-optical signal is given by $(S_{28a}+S_{28b}-S_{29a}-S_{29b})$. In the present embodiment, the halfwave plate 23 is used. However, the halfwave plate 23 may be omitted, provided that the polarized beam splitter 24 is rotated by an angle of 45°.

In the present embodiment, only a half of the reflected light beam from the disk 3 is used, and the remaining half of the reflected light beam is blocked. Alternatively, the whole of the reflected light beam can be used. Further, each of the photodetectors 28 and 29 may be disposed at a position different from a position where the light beam 26 (or 27) is focused.

Figure 4:
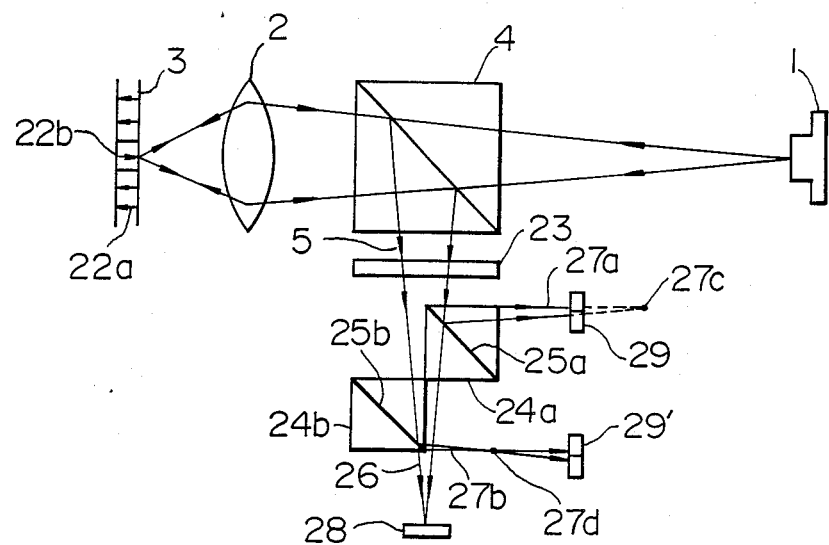
FIG. 4 is a schematic diagram showing an improved version of the embodiment of FIG. 1.

FIG. 4 shows an improved version of the present embodiment. The detecting principles of a focal error signal and a tracking error signal in the improved version of FIG. 4, will be explained below, with reference to FIGS. 3A, 3B, 4, and 5A to 5C. Referring to FIG. 4, polarized-beam splitters 24a and 24b are inserted in the light beam 5 so that a half of the light beam 5 is incident on the beam splitter 24a and the remaining half is incident on the beam splitter 24b. Polarized-light separating films 25a and 25b transmit an x-polarized component, and reflect a y-polarized component. When the light spot formed on the disk 3 moves from that portion of the disk 3 where information is not recorded, to that portion of the disk 3 where information has been recorded, the quantity of light 26 having passed through the polarized-beam splitters 24a and 24b is reduced by an amount corresponding to the difference in length between the arrows $21a_x$ and $21b_x$ shown in FIG. 3B, and the sum of the quantity of light 27a reflected from the beam splitter 24a and the quantity of light 27b reflected from the beam splitter 24b is increased by an amount corresponding to the difference in length between the arrows $21a_y$ and $21b_y$ shown in FIG. 3B. The transmitted light beam 26 is received by the photodetector 28, and the reflected light beams 27a and 27b are received by photodetectors 29 and 29', respectively. A magneto-optical signal can be obtained from the difference between the output of the photodetector 28 and the sum of the outputs of the photodetectors 29 and 29'.

Figure 5A:
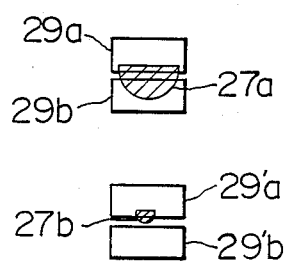
FIGS. 5A to 5C are schematic diagrams for explaining the detection principle of a tracking error signal used in the improved version of FIG. 4.
Figure 5B:
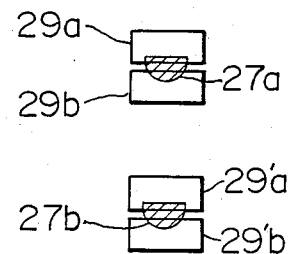
Figure 5C:
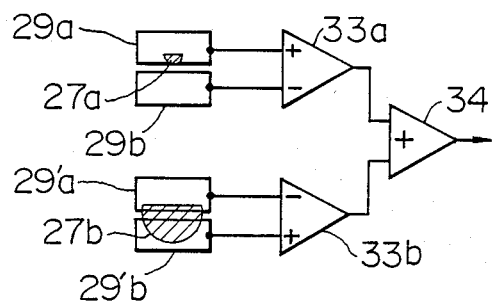

The light receiving surface of each of the photodetectors 29 and 29' is divided into two parts, and thus each photodetector is separated into two detecting elements. The photodetector 29 is disposed at a position which exists in front of a focus position where the reflected light beam 27a is focused, and is spaced apart from the focus position by a desired distance. Further, the photodetector 29' is disposed at a position which exists behind a focus position where the reflected light beam 27b is focused, and is separated from the focus position by the desired distance. In a case where the light beam from the light source 1 is focused on the disk 3, the light beams 27a and 27b form semicircular light spots 27a and 27b on the photodetectors 29 and 29', as shown in FIG. 5B. In this case, the semicircular light spots 27a and 27b have the same size. In a case where the disk 3 is displaced toward the focusing lens 5, the semicircular light spot 27a formed on the photodetector 29 is enlarged and the light spot 27b formed on the photodetector 29' becomes small, as shown in FIG. 5A. In a case where the disk 3 is displaced so as to go away from the focusing lens 2, the light spot 27b on the photodetector 29' is enlarged and the light spot 27a on the photodetector 29 becomes small, as shown in FIG. 5C. The outputs of two detecting elements 29a and 29b of the photodetector 29 are applied to a differential amplifier 33a, and the outputs of two detecting elements 29'a and 29'b of the photodetector 29' are applied to another differential amplifier 33b, as shown in FIG. 5C. Then, a focal error signal can be obtained from the output of each of the differential amplifiers 33a and 33b. However, a change in such a focal error signal due to the positional deviation of the disk 3 in a first direction perpendicular thereto is not equal to a change in the focal error signal due to the same positional deviation of the disk 3 in a second direction opposite to the first direction. When the outputs of the differential amplifiers 33a and 33b are applied to an adder 34 as shown in FIG. 5C, the output of the adder 34 can be used as a favorable focal error signal whose signal level is raised or lowered by the same amount, in accordance with whether the disk 3 is displaced by a desired distance in the first or second direction.

In the modified version of FIG. 4, not only the focal error signal and the magneto-optical signal but also a tracking error signal and a light quantity signal indicative of the light quantity reflected from the disk 3, can be obtained by the same optical system, in the same manner as will be explained later in detail for a different embodiment.

Figure 6:
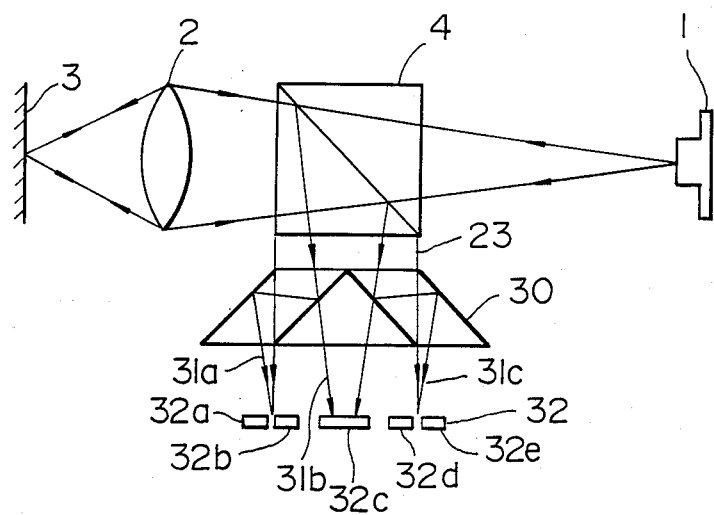
FIG. 6 is a schematic diagram showing another embodiment of an optical head according to the present invention.

FIG. 6 shows another embodiment of an optical head according to the present invention.

Figure 7:
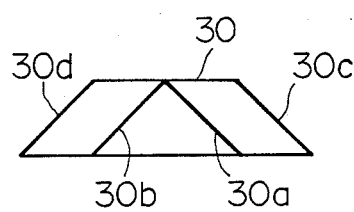
FIGS. 7 to 9 are schematic diagrams for explaining parts of the embodiment of FIG. 6 in detail.
Figure 8:
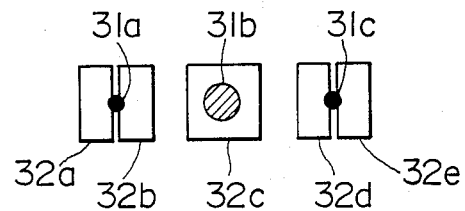
Figure 9:
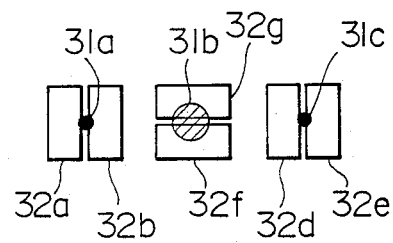

Referring to FIG. 6, the light beam emitted from the semiconductor laser 1 is focused on the magneto-optical disk 3 by the focusing lens 2 so that a fine light spot is formed on the disk 3. For example, the magneto-optical disk 3 is made up of a transparent substrate, a magnetic recording film formed on the substrate, and a protective layer for protecting the magnetic recording film. The light beam from the focusing lens 2 is focused on the magnetic recording film through the transparent substrate. A groove is formed in the disk 3 to guide the light spot along a track. One turn of the track is divided into a plurality of sectors, each of which includes a header portion containing address information and a data portion containing user data. Such a magneto-optical disk is disclosed in a U.S. patent application Ser. No. 685,123. Further, external magnetic field generating means, for example, an electromagnetic coil is disposed so that the magneto-optical disk is interposed between the electromagnetic coil and an optical head, though the electromagnetic coil is omitted from FIG. 6 for the sake of brevity (refer to, for example, U.S. patent application Ser. Nos. 743,974 and 932,578). Referring back to FIG. 6, the reflected light beam from the disk 3 is reflected from the beam splitter 4, and then impinges on a roof-shaped prism 30 (that is, a prism having a trapezoidal cross section) through the half-wave plate 23. As shown in FIG. 7, the prism 30 includes polarized-light separating films 30a and 30b which meet at an edge with an angle of about 90°, and reflecting surfaces 30c and 30d which are parallel to the films 30a and 30b, respectively. In more detail, the polarized-light separating films 30a and 30b meet on the optical axis of the light beam reflected from the beam splitter 4, and thus the y-polarized component of the light beam from the beam splitter 4 is divided into two equal parts. It is to be noted that a y-direction is perpendicular to the paper containing FIG. 6, and an x-direction is defined on the above paper. The x-polarized component of the light beam from the beam splitter 4 passes through the films 30a and 30b. Accordingly, the light beam incident on the prism 30 is separated into three light beams 31a, 31b and 31c. Further, the light beams 31a and 31c are reflected from the reflecting surfaces 30d and 30c, respectively, so as to travel in directions parallel to the traveling direction of the light beam 31b. A photodetector 32 is disposed so that each of the light beams 31a, 31b and 31c is focused on the photodetector 32. As shown in FIG. 8, the photodetector 32 is separated into five detecting elements 32a, 32b, 32c, 32d and 32e. The light beam 31a is incident on the detecting elements 32a and 32b. In a case where the light beam from the light source 1 is focused on the disk 3, the detecting elements 32a and 32b receive the same quantity of light. The light beam 31c is incident on the detecting elements 32d and 32e. In a case where the light beam from the light source 1 is focused on the disk 3, the detecting elements 32d and 32e receive the same quantity of light. The light beam 31b is received by the detecting element 32c. When the outputs of the detecting elements 32a, 32b, 32c, 32d and 32e are expressed by $S_{32a}$, $S_{32b}$, $S_{32c}$, $S_{32d}$ and $S_{32e}$, respectively, a focal error signal can be obtained from $(S_{32a}-S_{32b})$ or $(S_{32e}-S_{32d})$. Further, a focal error signal which is scarcely affected by the slight positional deviation of each optical element, can be obtained from $(S_{32a}-S_{32b}-S_{32d}+S_{32e})$. A magneto-optical signal is given by the difference between the light quantity of the y-polarized component and that of the x-polarized component, and hence can be obtained from $(S_{32a}+S_{32b}+S_{32d}+S_{32e}-S_{32c})$. Further, an information signal for detecting an information pit of the perforation type, phase type or phasechange type can be obtained from the sum of the outputs of the detecting elements 32a to 32e. In a case where a track on the disk 3 is extended on the paper containing FIG. 6, a tracking error signal can be obtained in such a manner that the detecting element 32c is divided along a transverse line into two detecting parts 32f and 32g as shown in FIG. 9, and the difference between the outputs of the detecting parts 32f and 32g is used as the tracking error signal. While, in a case where a track on the disk 3 is extended in a direction perpendicular to the paper containing FIG. 6, a tracking error signal can be obtained in such a manner that the detecting element 32c is divided along a longitudinal direction into two detecting parts similar to the detecting elements 32a and 32b, and the difference between the outputs of the detecting parts is used as the tracking error signal. In this case, another tracking error signal can be obtained from $(S_{32a}+S_{32b}-S_{32d}-S_{32e})$. Further, when the beam splitter 4, the halfwave plate 23 and the prism 30 are bonded to each other so that these optical elements are united in one body as shown in FIG. 6, an assembling operation for making the present embodiment becomes easy. According to the present embodiment, the magneto-optical signal, the focal error signal, the tracking error signal and the information signal for detecting an information pit of the perforation type, phase type or phase-change type can be produced by one united optical element and one photodetecter including a plurality of detecting elements. In other words, the present embodiment is small in the number of parts used, low in manufacturing cost, and small in size and weight.

Figure 10:
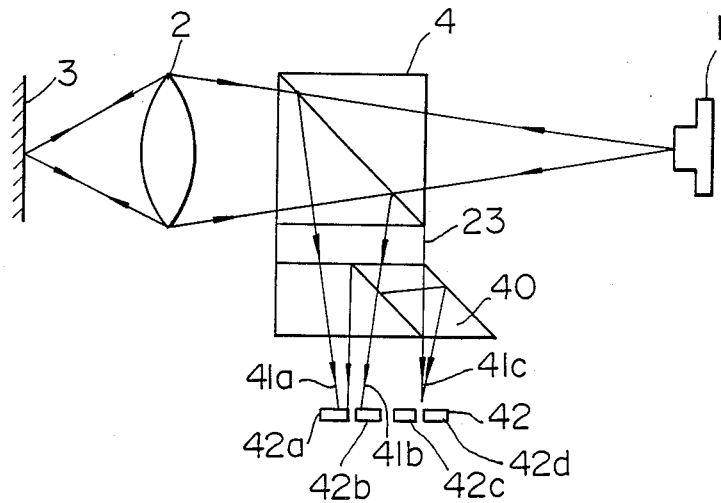
FIG. 10 is a schematic diagram showing a further embodiment of an optical head according to the present invention.
Figure 11:
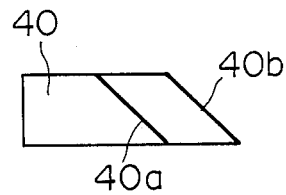
FIGS. 11 to 13 are schematic diagrams for explaining parts of the embodiment of FIG. 10 in detail.
Figure 12:
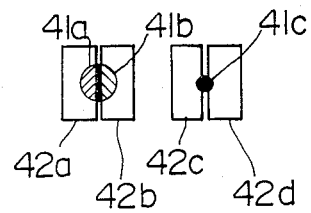
Figure 13:
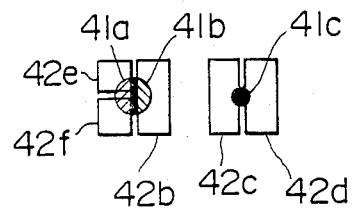

FIG. 10 shows a further embodiment of an optical head according to the present invention. In FIGS. 6 and 10, the same reference numerals designate like parts. In the present embodiment, a prism 40 is used in place of the prism 30 of FIG. 6. As shown in FIG. 11, the prism 40 includes a polarized-light separating film 40a and a reflecting surface 40b substantially parallel to the film 40b. Referring to FIG. 10 the prism 40 is disposed so that a half of the light beam reflected from the beam splitter 4 is separated by the polarized-light separating film 40a into light beams 41b and 41c, and the remaining half, that is, a light beam 41a passes through the prism 40. The light beam 41c is reflected from the reflecting surface 40b so as to travel in a direction parallel to the traveling direction of the light beam 41b. The light beams 41a to 41c are received by a photodetector 42. As shown in FIG. 12, the photodetector 42 is separated into four detecting elements 42a, 42b, 42c and 42d, and is disposed so that the light beam 41c is focused on a gap between the detecting elements 42c and 42d. In a case where the light beam from the light source 1 is focused on the disk 3, the detecting elements 42c and 42d receive the same quantity of light. The detecting elements 42b and 42a receive the light beams 41b and 41a, respectively. When the outputs of the detecting elements 42a, 42b, 42c and 42d are expressed by $S_{42a}$, $S_{42b}$, $S_{42c}$ and $S_{42d}$, respectively, a focal error signal is obtained from $(S_{42c}-S_{42d})$, and a magneto-optical signal is obtained from $(S_{42c}+S_{42d}-S_{42b})$. Further, an information signal for detecting an information pit of the perforation type, phase type or phasechange type can be obtained from $(S_{42a}+S_{42b}+S_{42c}+S_{42d})$. In a case where a track on the disk 3 is extended on the paper containing FIG. 10, a tracking error signal can be obtained in such a manner that the detecting element 42a is separated into two detecting parts 42e and 42f as shown in FIG. 13, and the difference between the outputs of the detecting parts 42e and 42f is used as the tracking error signal. While, in a case where a track on the disk 3 is extended in a direction perpendicular to the paper containing FIG. 10, a tracking error signal can be obtained from $(S_{42b}+S_{42c}+S_{42d}-S_{32a})$. The beam splitter 4, the halfwave plate 23, and the prism 40 may be bonded to each other, to form a united body. Like the embodiment of FIG. 6, the present embodiment is small in the number of parts used, low in manufacturing cost, and small in size and weight.

The embodiments of FIGS. 6 and 10 include the halfwave plate 23. However, the halfwave plate 23 may be omitted, provided that the prism 30 or 40 is rotated by an angle of 45°. In this case, the prism 30 or 40 may be bonded to the beam splitter 4. The embodiments of FIGS. 6 and 10 is applicable to a case where a collimotor lens is used in addition to the focusing lens 2. In this case, another focusing lens is disposed between the beam splitter 4 and the prism 30 or 40, or between the prism 30 or 40 and the photodetector 32 and 42.

Figure 14:
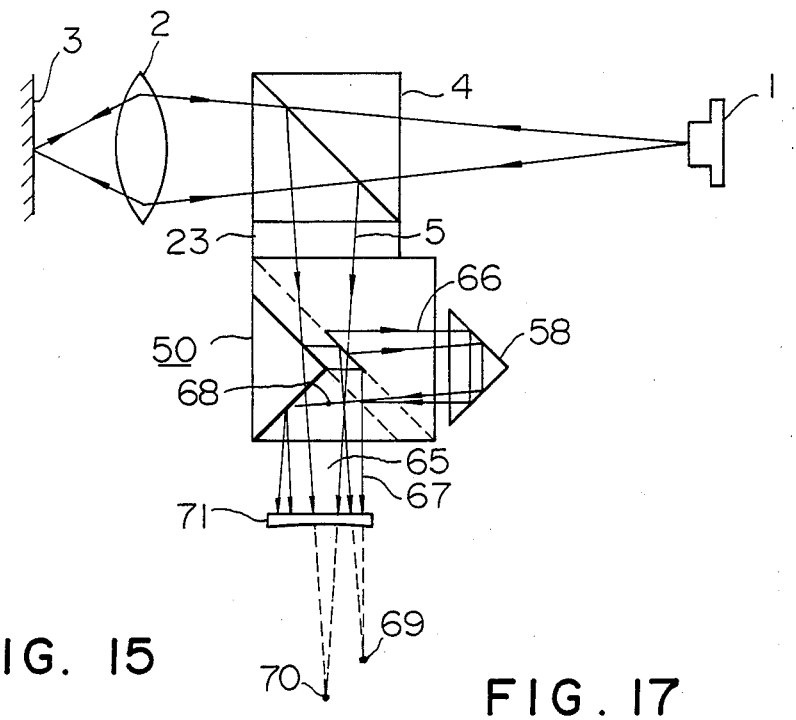
FIG. 14 is a schematic diagram showing still another embodiment of an optical head according to the present invention.
Figure 15:
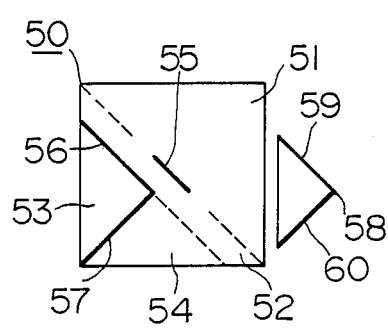
FIGS. 15 to 18 are schematic diagrams for explaining parts of the embodiment of FIG. 14 in detail.
Figure 17:
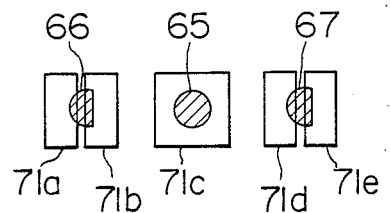
Figure 16:
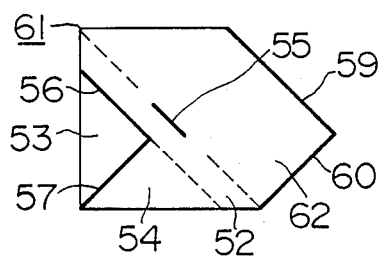
Figure 18:
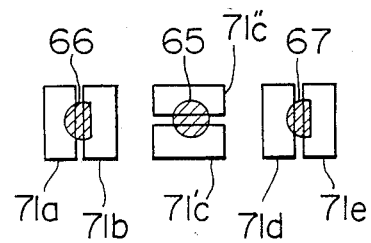

FIG. 14 shows still another embodiment of an optical head according to the present invention. In FIGS. 6, 10 and 14, the same reference numerals designate like parts. Referring to FIG. 14, the light beam 5 reflected from the magneto-optical disk 3 is separated by a beam splitting prism 50 and a rectangular prism 58 into three light beams 65, 66 and 67. FIG. 15 shows the prisms 50 and 58 in detail. As shown in FIG. 15, the beam splitting prism 50 includes a trigonal prism 51, a glass plate 52 having parallel main surfaces, another trigonal prism 53, a further trigonal prism 54, and polarized-light separating films 55 to 57. After each of the prisms 51, 53 and 54 and the glass plate 52 has been polished so as to have desired dimensions, the polarized-light separating films 55, 56 and 57 are deposited on the prisms 51, 53 and 54, respectively. Then, these prisms are bonded to each other by a resin which can be hardened by ultraviolet rays. That polarized component of the light beam 5 whose electric vector vibrates in directions parallel to the paper containing FIG. 14, that is, the P-polarized component, i.e. the polarized component whose polarization plane is parallel to the surface of the paper of FIG. 14, incident on the prism 50 passes through the polarized-light separating films 55, 56 and 57, and forms a light beam 65 having a circular cross section. The light beam 65 is focused on a point 70. The right half of the S-polarized component, i.e. the polarized component whose polarization plane is perpendicular to that of the P-polarized component, of the light beam 5 is reflected from the film 55, and forms a light beam 66 having a semicircular cross section. The light beam 66 is reflected from each of the reflecting surfaces 59 and 60 of the rectangular prism 58, and is then reflected from the film 57. The left half of the S-polarized component of the light beam 5 is reflected from the film 56, and forms a light beam 67 having a semicircular cross section. Then, the light beam 57 is reflected from the film 55. As shown in FIG. 14, after having passed through the beam splitting prism 50 and the rectangular prism 58, the light beams 65, 66 and 67 can travel in parallel directions. Accordingly, the light beams 65 to 67 can be received by a single photodetector 71. The photodetector 71 is disposed at that position on an optical axis which is located midway between a point 68 where the light beam 66 having a semicircular cross section is focused, and a point 69 where the light beam 67 having a semicircular cross section is focused. FIG. 17 shows the light receiving surface of the photodetector 71. As shown in FIG. 17, the light beam 66 having a semicircular cross section is received by left detecting elements 71a and 71b of the photodetector 71, and the light beam 67 having a semicircular cross section is received by right detecting elements 71d and 71e of the photodetector 71. Further, the light beam 65 which is formed of the P-polarized component and has a circular cross section, is received by a central detecting element 71c of the photodetector 71. When the outputs of the detecting elements 71a, 71b, 71c, 71d and 71e are expressed by $S_{71a}$, $S_{71b}$, $S_{71c}$, $S_{71d}$ and $S_{71e}$, respectively, a focal error signal can be obtained from $(S_{71a} - S_{71b} - S_{71d} + S_{71e})$, and a magneto-optical signal can be obtained from $(S_{71a} + S_{71b} + S_{71d} + S_{71e} - S_{71c})$. Further, an information signal for detecting an information pit of the perforation type, phase type or phasechange type can be obtained from $(S_{71a} + S_{71b} + S_{71c} + S_{71d} + S_{71e})$. In a case where a track on the disk 3 is extended in a direction perpendicular to the paper containing FIG. 14, a tracking error signal can be obtained from $(S_{71a} + S_{71b} - S_{71d} - S_{71e})$. While, in a case where a track on the disk 3 is extended on the paper containing FIG. 14, a tracking error signal can be obtained in such a manner that the detecting element 71c is separated into two detecting parts 71c' and 71c'' as shown in FIG. 18, and the difference between the outputs of the detecting parts 71c' and 71c'' is used as the tracking error signal. By moving the rectangular prism 58 upward and downward in FIG. 14, the distance between the light beams 66 and 67 can be freely adjusted. Thus, it is possible to make low the working accuracy of optical elements, that is, a small working/assembling error can be substantially cancelled by the above adjusting operation. In a case where the adjustment of the distance between the light beams 66 and 67 is not required, the beam splitting prism 50 and the rectangular prism 58 may be united in one body 61 as shown in FIG. 16. Referring to FIG. 16, a trapezoidal prism 62 is obtained by uniting the trigonal prism 51 and the rectangular prism 58 in one body, and other optical elements 52, 53, 54, 55, 56 and 57 are the same as shown in FIG. 15. When the beam splitter 4, the halfwave plate 23 and the prism 50 or 61 are bonded to each other so as to form a united body, an assembling operation for forming the present embodiment becomes easy. Further, the halfwave plate 23 may be omitted, provided that the prisms 50, 58 and 61 and the photodetector 71 are rotated round an optical axis by an angle of 45°.

Figure 19:
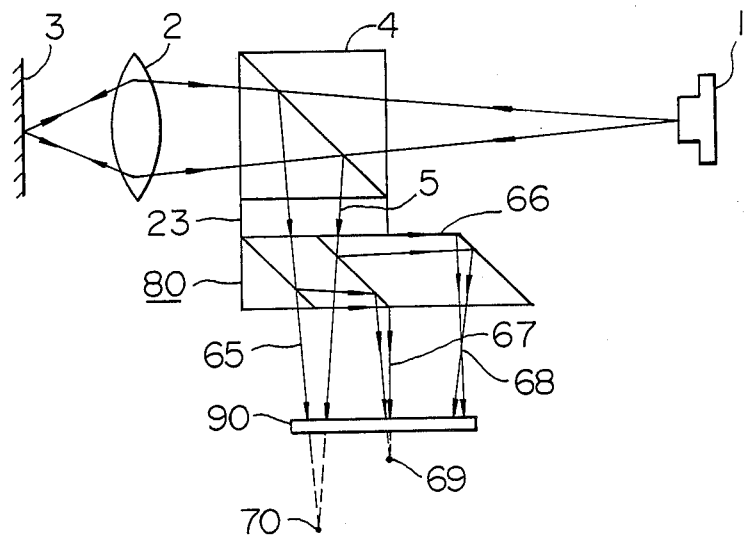
FIG. 19 is a schematic diagram showing still a further embodiment of an optical head according to the present invention.
Figure 20:
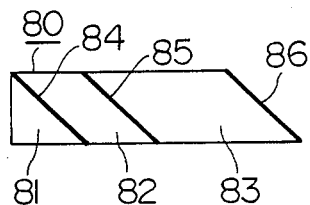
FIGS. 20 to 22 are schematic diagrams for explaining parts of the embodiment of FIG. 19 in detail.
Figure 21:
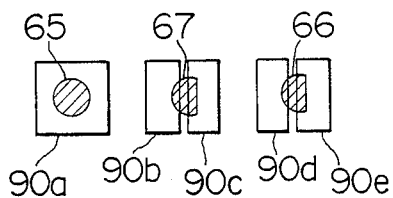
Figure 22:
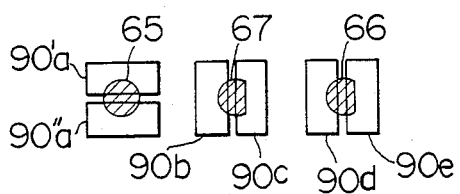

FIG. 19 shows still a further embodiment of an optical head according to the present invention. In FIGS. 6, 10, 14 and 19, the same reference numerals designate like parts. Referring to FIG. 19, a beam splitting prism 80 splits the light beam 5 reflected from the magneto-optical disk 3 into three light beams 65, 66 and 67. As shown in FIG. 20, the beam splitting prism 80 is made up of a trigonal prism 81 and parallelogrammic prisms 82 and 83. Further, a polarized-light separating films 84 is formed between the prisms 81 and 82, and another polarized-light separating film 85 is formed between the prisms 82 and 83. Referring back to FIG. 19, the P-polarized component of the light beam 5 passes through the polarized-light separating films 84 and 85, and forms the light beam 65 having a circular cross section. The right half of the S-polarized component of the light beam 5 is reflected from the film 85, and forms the light beam 66 having a semicircular cross section. The light beam 66 is reflected from a reflecting surface 86 of the prism 83. While, the left half of the S-polarized component of the light beam 5 is reflected from the films 84 and 85, and forms the light beam 67 having a semicircular cross section. As in the embodiment of FIG. 16, the light beams 65, 66 and 67 emerging from the prism 80 travel in parallel directions. Thus, the light beams 65 to 67 can be received by a photodetector 90 having five detecting elements 90a to 90e, in a manner shown in FIG. 21. When the outputs of the detecting elements 90a, 90b, 90c, 90d and 90e are expressed by $S_a$, $S_b$, $S_c$, $S_d$ and $S_e$, respectively, a focal error signal is obtained from $(S_b - S_c) + (S_d - S_e)$, and a magneto-optical signal is obtained from $S_a - (S_b + S_c + S_d + S_e)$. Further, an information signal for detecting an information pit of the perforation type, phase type or phasechange type can be obtained from $(S_a+S_b+S_c+S_d+S_e)$. In a case where a track on the disk 3 is extended in a direction perpendicular to the paper containing FIG. 19, a tracking error signal is obtained from $(S_b+S_c)-(S_d+S_e)$. While, in a case where a track on the disk 3 is extended on the paper containing FIG. 19, a tracking error signal can be obtained in such a manner that the detecting element 90a is separated into two detecting parts 90'a and 90''a as shown in FIG. 22, and the difference between the outputs of the detecting parts 90'a and 90''a is used as the tracking error signal.

As has been explained in the foregoing, according to the present invention, not only an information signal for detecting an information pit of the perforation type, phase type or phasechange type but also a magneto-optical signal, a focal error signal and a tracking error signal can be detected by the same optical system, and moreover these signals can be obtained from a single photodetector. That is, according to the present invention, there is provided an optical head which is small in the number of optical parts used, low in manufacturing cost, and small in size and weight.

We claim:

1. An optical head comprising:
   a light source;
   focusing means for focusing a light beam which is emitted from said light source, on an information medium;
   beam separating means for isolating at least part of a light beam which is reflected from said information medium, from the light beam emitted from said light source;
   beam splitting means including a first polarized-light separating film, said first polarized-light separating film being illuminated with about a half of a light beam isolated by said beam separating means; and
   light detecting means including first and second photodetectors, said first photodetector being used to receive a first light beam reflected from said first polarized-light separating film, said second photodetector being used to receive a second light beam passing through said first polarized-light separating film, at least one of said first and second photodetectors being separated into a pair of light detecting elements.

2. An optical head according to claim 1, wherein said beam splitting means is a prism having said first polarized-light separating film and a reflecting surface substantially parallel to said first polarized-light separating film, and one of said first and second light beams is reflected from said reflecting surface in a direction parallel to the traveling direction of the other light beam.

3. An optical head according to claim 2, wherein said first and second photodetectors are disposed on the same plane.

4. An optical head according to claim 1, wherein said beam splitting means further includes a second polarized-light separating film which is illuminated with the remaining half of the light beam isolated by said beam separating means, said light detecting means further includes a third photodetector which receives a third light beam reflected from said second polarized-light separating film, and said second photodetector receives not only said second light beam but also a light beam passing through said second polarized-light separating film.

5. An optical head according to claim 3, wherein said light detecting means further includes a third photodetector disposed on a plane, on which said first and second photodetectors are disposed, for receiving the remaining half of the light beam isolated by said beam separating means.

6. An optical head according to claim 5, wherein said third photodetector is separated into a pair of light detecting elements.

7. An optical head according to claim 4, wherein said beam splitting means is a prism including said first and second polarized-light separating films and first and second reflecting surfaces substantially parallel to said first and second polarized-light separating films, respectively, and wherein said first and second polarized-light separating films are substantially perpendicular to each other.

8. An optical head according to claim 7, wherein said first, second and third photodetectors are disposed on the same plane.

9. An optical head according to claim 3, wherein said first photodetector is disposed at a position, on which said first light beam is focused.

10. An optical head according to claim 4, wherein said first and second polarized-light separating films are substantially parallel to each other.

11. An optical head according to claim 10, wherein said beam splitting means includes a first reflecting surface substantially parallel to said first polarized-light separating film for reflecting said first light beam so that said first and second light beams travel in parallel directions, and wherein said first detector is disposed behind a position, on which said first light beam is focused, said third photodetector is disposed in front of a position, on which said third light beam is focused, and moreover said first, second and third photodetectors are disposed on the same plane.

12. An optical head according to claim 11, wherein said beam splitting means further includes a second reflecting surface substantially perpendicular to said first reflecting surface, and a third polarized-light separating film substantially perpendicular to said second polarized-light separating film.

13. An optical head according to claim 1, wherein a halfwave plate is sandwiched between said beam separating means and said beam splitting means, and wherein said beam separating means, said halfwave plate and said beam splitting means are bonded to each other, to form a united body.

14. An optical head comprising:
   a light source;
   focusing means for focusing a light beam which is emitted from said light source, on an information medium;
   beam separating means for isolating at least part of a light beam which is reflected from said information medium, from the light beam emitted from said light source;
   beam splitting means including a first polarized-light separating film and a first reflecting surface substantially parallel thereto, said first polarized-light separating film being illuminated with about a half of a light beam isolated by said beam separating means, a first light beam reflected from said first polarized-light separating film being reflected from said first reflecting surface so that said first light beam travels in a direction parallel to the traveling direction of a second light beam passing through said first polarized-beam separating film; and light detecting means including first and second photodetectors, said first and second photodetectors being disposed on the same plane, said first photodetector being used to receive said first light beam, said second photodetector being used to receive said second light beam, at least one of said first and second photodetectors being separated into a pair of light detecting elements.

15. An optical head according to claim 14, wherein said light splitting means further includes a second polarized-light separating film which is illuminated with the remaining half of the light beam isolated by said beam separating means, said light detecting means further includes a third photodetector which receives a third light beam reflected from said second polarized-light separating film, and said second photodetector receives not only said second light beam but also a light beam passing through said second polarized-light separating film.

16. An optical head according to claim 14, wherein said light detecting means further includes a third photodetector disposed on a plane, on which said first and second photodetectors are disposed, for receiving the remaining half of the light beam isolated by said beam separating means.

17. An optical head according to claim 15, wherein said beam splitting means is a prism including said first and second polarized-light separating films and first and second reflecting surfaces substantially parallel to said first and second polarized-light separating films, respectively, and wherein said first and second polarized-light separating films are substantially perpendicular to each other.

18. An optical head according to claim 15, wherein said first and second polarized-light separating films are substantially parallel to each other.

19. An optical information processor comprising:
a light source;
focusing means for focusing a light beam which is emitted from said light source, on an information medium;
beam separating means for isolating at least part of a light beam which is reflected from said information medium, from the light beam emitted from said light source;
beam splitting means including a first polarized-light separating film and a first reflecting surface substantially parallel thereto, said first polarized-light separating film being illuminated with about a half of a light beam isolated by said beam separating means, a first light beam reflected from said first polarized-light separating film being reflected from said first reflecting surface so that said first light beam travels in a direction parallel to the traveling direction of a second light beam passing through said first polarized-light separating film;
light detecting means including first and second photodetectors, said first and second photodetectors being disposed on the same plane, said first photodetector being used to receive said first light beam, said second photodetector being used to receive said second light beam, at least one of said first and second photodetectors being separated into a pair of light detecting elements; and
signal processing means for detecting a focal error signal on the basis of the difference between the outputs of said light detecting elements, and for reproducing magnetization information which is recorded in said information medium, on the basis of the difference between the outputs of said first and second photodetectors.

20. An optical information processor according to claim 19, wherein said beam splitting means further includes a second polarized-light separating film which is illuminated with the remaining half of the light beam isolated by said beam separating means, said light detecting means further includes a third photodetector which receives a third light beam reflected from said second polarized-light separating film, said second photodetector receives not only said second light beam but also a light beam passing through said second polarized-light separating film, and said signal processing means further detects a tracking error signal on the basis of the difference between the outputs of said first and third photodetectors.

* * * * *